US005889588A

United States Patent [19]
Santman et al.

[11] Patent Number: 5,889,588
[45] Date of Patent: Mar. 30, 1999

[54] RANDOM WAVELENGTH ACCESS MONOCHROMATOR INCORPORATING COAXIAL OFF-AXIS PARABOLIC OAP REFLECTORS

[75] Inventors: Jeffry J. Santman, East Windsor, N.J.; Ronald J. Kovach, Langhorne, Pa.

[73] Assignee: Photon Technology International, South Brunswick, N.J.

[21] Appl. No.: 934,103

[22] Filed: Sep. 19, 1997

Related U.S. Application Data

[60] Provisional application No. 60/026,627, Sep. 24, 1996.
[51] Int. Cl.$^6$ .................................................. G01J 3/18
[52] U.S. Cl. .......................................... 356/334; 356/308
[58] Field of Search .................................. 356/308, 326, 356/328, 332, 334

[56] References Cited

U.S. PATENT DOCUMENTS

| | | | |
|---|---|---|---|
| 2,750,836 | 6/1956 | Fastie | 356/332 |
| 3,011,391 | 12/1961 | Fastie | 356/334 |
| 3,888,590 | 6/1975 | White | 356/334 |
| 4,634,276 | 1/1987 | Sharpe | 356/305 |
| 4,984,888 | 1/1991 | Tobias | 356/328 |
| 4,995,721 | 2/1991 | Krupa et al. | 356/305 |
| 4,995,725 | 2/1991 | Riedel et al. | 356/334 |
| 5,089,915 | 2/1992 | Gobell | 359/846 |
| 5,192,981 | 3/1993 | Slutter et al. | 356/334 |
| 5,285,255 | 2/1994 | Baranne et al. | 356/328 |
| 5,305,083 | 4/1994 | Marianik et al. | 356/332 |
| 5,384,656 | 1/1995 | Schwenker | 356/305 |
| 5,448,351 | 9/1995 | Florek et al. | 356/328 |
| 5,497,231 | 3/1996 | Schmidt | 356/334 |
| 5,532,818 | 7/1996 | Tokumoto | 356/332 |

FOREIGN PATENT DOCUMENTS

| 37 34 588 | 6/1992 | Germany | 356/334 |
|---|---|---|---|

OTHER PUBLICATIONS

"Coma Canceling Monochromator with No Slit Mismatch" by V.L. Chupp and P.C. Grantz vol. 8, No. 5 —Applied Optics —May, 1969.

*Primary Examiner*—F. L. Evans
*Attorney, Agent, or Firm*—Woodbridge & Associates

[57] ABSTRACT

A random wavelength access monochromator incorporates a pair of coaxial off-axis parabolic reflectors configured so that the spherical aberrations introduced by the reflectors cancel each other. Light enters through an entrance slit and impinges upon a first off-axis parabolic reflector that collimates the beam and directs it towards a stationary grating. The grating in turn defracts the light and directs it towards a high speed scanning mirror which reflects the defracted light onto a second off-axis parabolic reflector which in turn focuses the beam to an exit slit. Both off-axis parabolic surfaces share the same axis of revolution and the same collimated beam axis. In order to make the apparatus practical, the beam is folded twice so that the exit point is focused away from the internal path of the beam. The resulting instrument is capable of accepting a broad wavelength beam of light, dividing that broad band light into discrete wavelength bands of less than 1 nm optic wavelength, and emitting only the desired wavelength band.

2 Claims, 4 Drawing Sheets

RANDOM WAVELENGTH ACCESS MONOCHROMATOR INCORPORATING COAXIAL OFF-AXIS PARABOLIC OAP REFLECTORS

This application is a continuation of provisional application Ser. No. 60/026,627, filed on Sep. 24, 1996.

BACKGROUND OF THE INVENTION

1. Field of the Invention

The invention comprises a random wavelength access monochromator incorporating a pair of coaxial off-axis parabolic reflectors whose spherical aberrations mutually cancel each other.

2. Description of Related Art

For close to a century, optical instrument manufacturers have been able to produce devices capable of dividing a broad band beam of light into individual wavelengths, and emitting only desired wavelength(s). These devices could be manually changed to emit different wavelength bands.

More recently, motor drives have been added that allowed rapid and automatic changes between wavelength bands. The speed of transition from one wavelength band to another has been, and is still, limited by the torque generating capacity of the motor, and the mass of the mechanism used to divide the broad band light into its discrete wavelength bands. High precision stepping motors are typically used, with large ratio (200:1) reduction-gear attached to provide the necessary precision of positioning. Typical positioning requirements are on the order of 0.004 degrees, equivalent to a change of 0.25 nm of optical wavelength for a ¼ meter class monochromator (assuming 1200 l/mm grating).

While these motors do provide for improved usefulness and control over manual methods, their speed is limited by the fact that they must always move in increments of precision equivalent to their smallest step, and they must always move using the same high ratio reduction gear drive. Therefore, to move from a position of, for example, 450 nm to 600 nm, if the system had a precision of 0.25 nm, the motor has to make 600 individual steps. Further, each step is driving a 200:1 drive train. As a function of physical laws, the greater the speed of the transition, the less accurate the positioning. Conversely, the more accurate the positioning, the slower the transition. Typical practical transition times are "2100 nm per minute", or approximately 30 milliseconds per nm. The transition time for the example above would be 30 milliseconds×150 nm=4.5 seconds with an accuracy of 1 nm.

In order to achieve a more rapid transition between wavelength bands, the use of multiple beams of filtered wavelengths, combined by optical-mechanical methods, is prevalent. This is a costly solution, and does not provide for sequential wavelength scanning of the full spectrum of wavelengths.

The recent development of high speed, low torque oscillating motors, or galvanometer scanners has improved the situation somewhat. The scanner is typically attached to a small mirror, which oscillates between two angular positions. When properly positioned near the exit aperture of the monochromator, the instrument can oscillate between two discrete wavelength bands of emitted light. Unfortunately, these motors are not capable of producing very high torque. Therefore, due to mass constraints, the mirror must be relatively small. The small size of the mirror severely restricts the optical wavelength range within which the instrument can oscillate (usually 50–100 nm), which means that the instrument must have a second (slower, higher precision) drive to extend the oscillating range to a more practical range. Another problem with this methodology is that the beam exiting the monochromator changes angle as it changes wavelength. The closer the scanning mirror is to the exit slit, and the greater the transition angle of the scanner, the greater the angle that the beam changes. This leads to alignment problems with "downstream" optics. Further, the scanners can typically only oscillate at fixed resonant frequencies about 2 fixed positions. This prevents the instrument from being useful for anything but slewing or oscillation between fixed wavelengths, at fixed separations, at fixed speeds. There is no practical way to scan or randomly select wavelengths at various high speeds using this methodology.

More recent developments in scanner motor design have led to a scanner that can not only oscillate, but can move randomly or sequentially throughout its full angular transition range. The precision of positioning is on the order of 0.004° within that range. At least one instrument has been developed that uses this class of motor to select emitted wavelengths. This instrument directly couples the motor to the optical component that separates the broad band light into discrete wavelengths by using a moving grating. However, due to the mass of the grating and its mount, the transition speed is limited. The transition time between wavelengths is only in the millisecond time domain when the wavelengths are relatively close (50 nm), and only when moving in one direction. The inertia of the same component, and the low torque capacity of the motor, requires additional time to slow, stop, and accelerate the component back to the original position. This restriction prohibits the instrument from being able to maintain millisecond transition times for almost any practical wavelength separation range, or mode of change.

The prior art patent literature describes a variety of devices that use multiple mirrors, some of them parabolic, in the context of slit imaging systems. A relevant sampling of those patents is described below.

U.S. Pat. No. 4,634,276 entitled SLIT IMAGING SYSTEM USING TWO CONCAVE MIRRORS describes an off-axis system employing two mirrors $P_1$ and $P_2$.

U.S. Pat. No. 5,532,818 entitled DIFFERENCE DISPERSIVE DOUBLE PATH MONOCHROMATOR HAVING A WAVELENGTH INDEPENDENT IMAGING POINT describes a monochromator that employs two parabolic mirrors to reflect the path of the light energy.

U.S. Pat. No. 5,089,915 entitled FABRICATION OF ASPHERIC SURFACES THROUGH CONTROLLED DEFORMATION OF THE FIGURE OF SPHERICAL REFLECTIVE SURFACES describes another system which could employ an off-axis parabolic mirror or a torque mirror in a specific context.

U.S. Pat. No. 4,995,725 entitled MONOCHROMATOR ARRANGEMENT also describes a monochromator system employing a parabolic mirror.

U.S. Pat. No. 5,384,656 entitled ASTIGMATISM CORRECTED GRATINGS FOR PLANE GRATING AND SPHERICAL MIRROR SPECTROGRAPHS describes another arrangement for correcting astigmatic problems.

U.S. Pat. No. 5,305,083 entitled RANDOM ACCESS MONOCHROMATOR suggests the general state of the art.

U.S. Pat. No. 5,192,981 describes a CZERNY-TURNER MONOCHROMATOR which is typical of early prior art efforts and is a technique that is generally well known.

U.S. Pat. No. 5,497,231 entitled MONOCHROMATOR HAVING AN OSCILLATING MIRROR BEAM-DIFFRACTING ELEMENT FOR SPECTROMETERS describes another technique employing lenses, a two position oscillatory mirror, and a grating.

The following patents are cited as being of general interest only and do not appear to be otherwise relevant to the specific invention: U.S. Pat. Nos. 4,984,888; 4,995,721; 5,448,351; and 5,285,255.

In general, insofar as understood, none of the prior art when taken individually or in combination appears to suggest the novel system described herein in which two concave parabolic mirrors are aligned in a coaxial arrangement such that their spherical aberrations subtract and substantially cancel. Moreover, this arrangement is preserved by the use of a folding mirror located between the dispersive elements, i.e., the grating, and either one of the concave off-axis parabolic mirrors. Lastly, the invention is unusual in the fact that the same folding mirror, and not the grating (as is typically the case), is used as the primary means of a wavelength selected.

SUMMARY OF THE INVENTION

Briefly described, the invention comprises a random wavelength access monochromatic illuminator which incorporates a pair of coaxial off-axis parabolic reflectors arranged so that their spherical aberrations subtract and substantially mutually cancel. White light enters through a slit and impinges upon a first off-axis parabolic reflector which collimates the beam and directs it towards a stationary grating. The grating defracts the beam which is forwarded to a high speed scanning mirror which, in turn, reflects the beam onto a second off-axis parabolic reflector and onto an exit slit. Both off-axis parabolic reflective surfaces share the same axis of resolution and the same collimated beam axis. Therefore, they do not oppose each other such that the spherical aberrations of the first off-axis parabolic mirror are substantially canceled by the second off-axis parabolic mirror. In addition, the beam is folded twice so that it does not impinge upon the collimated beam path between the grating and the first OAP mirror. This results in a practical instrument capable of accepting a broad wavelength of light, i.e., white light, dividing that broad wavelength light into discrete wavelength bands of less than 1 nm wavelength, and emit only the desired wavelength band. The device is capable of transmitting ultra-violet, visible and near-infrared optical wavelengths in the range of the full optical spectrum, depending on the grating used. The device is also capable of changing wavelength bands in less than 2 milliseconds and operating in four different modes, namely alternating, scanning, random and slewing.

These and other features of the invention will be more fully understood by reference to the following drawings.

DETAILED DESCRIPTION OF THE INVENTION

During the course of the description, like numbers will be used to identify like elements according to the different figures that illustrate the invention.

Figure 1:
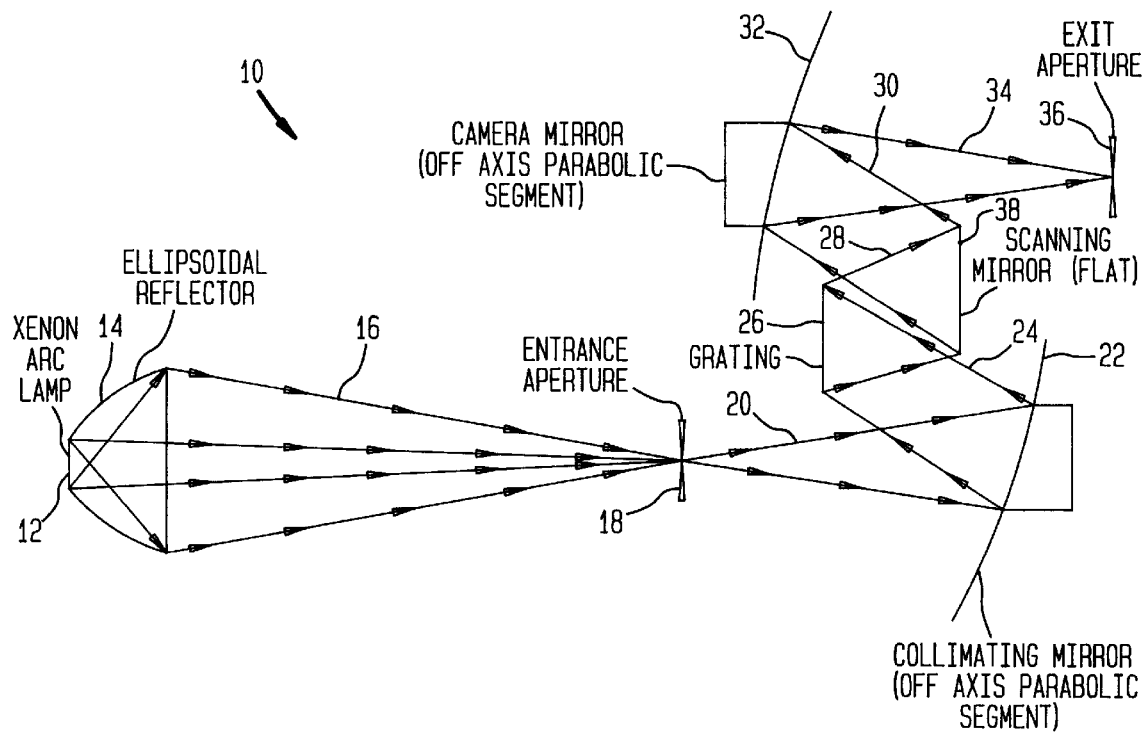
FIG. 1 is a general schematic of the preferred embodiment of the invention.
Figure 7:
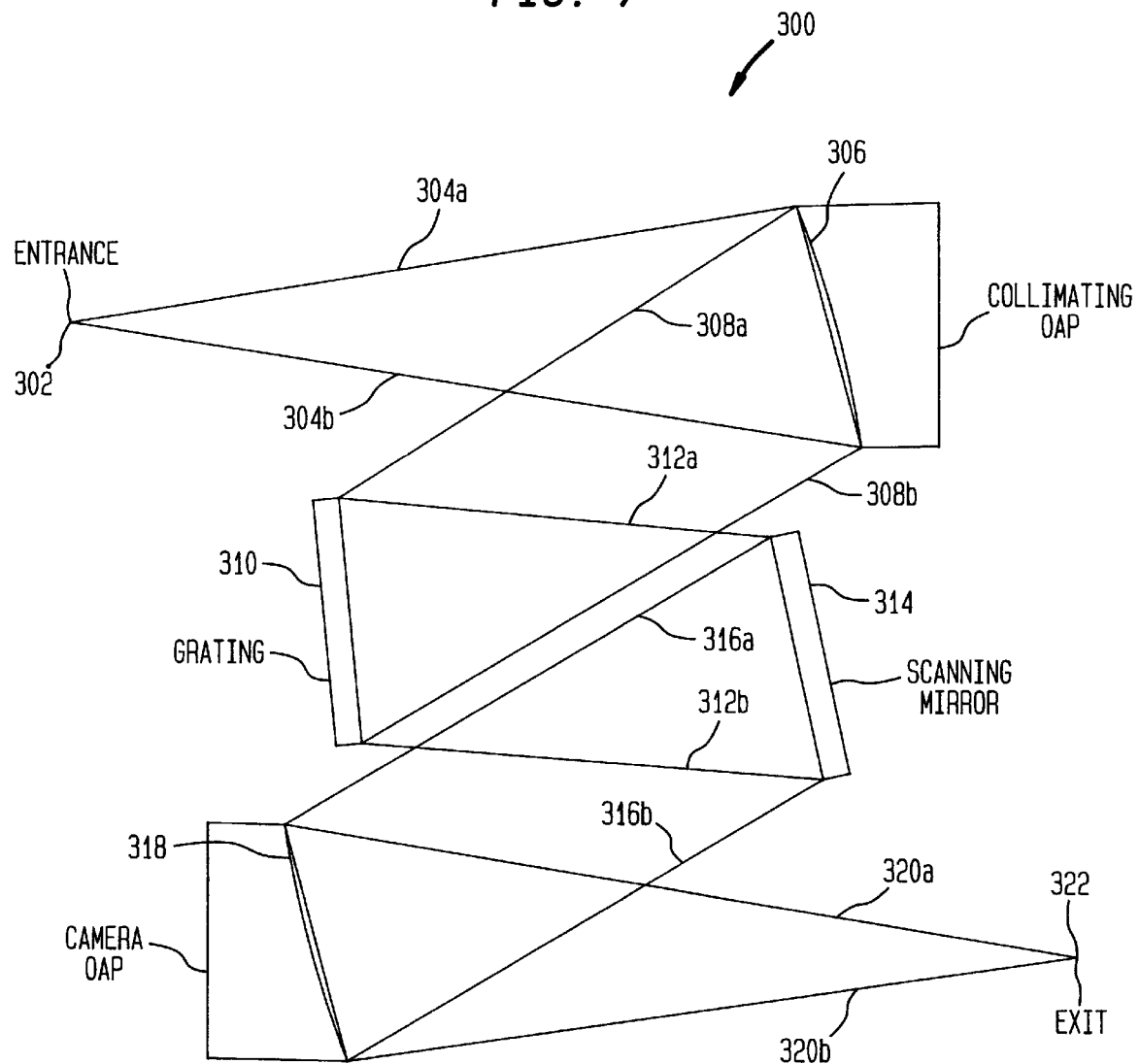
FIG. 7 illustrates schematically the preferred embodiment of the invention, similar to that illustrated in FIG. 1, in which the light path is folded twice.

The preferred embodiment of the invention 10 and 300 are illustrated in FIGS. 1 and 7, respectively. Embodiment 10, in FIG. 1, illustrates the specific elements of the invention and FIG. 7 illustrates the invention 300, in a more schematic fashion as it is explained in the context of prior art systems shown in FIGS. 2–4.

As illustrated in FIG. 1, the preferred embodiment of the invention 10 includes a Xenon arc lamp 12 which provides a broad band of light energy. The energy is collected by ellipsoidal reflector 14 and focused as a beam 16 on the entrance aperture, or slit 18, of the device 10. The entrance aperture 18 is a vertical slit shaped aperture having a precisely controlled variable width and height. The energy beam 20 that passes through the entrance aperture 18 diverges and strikes the first collimating mirror 22. The collimating mirror 22 is an off-axis parabolic segment. Collimating mirror 22 collimates the energy into a beam 24 that is directed toward grating 26. The grating 26 is a flat "reflective" optical surface having highly precise vertical lines cut or ruled into its surface. The grating 26 is the primary dispersive element of the preferred embodiment of the invention 10. The energy 24 that strikes the grating 26 is defracted into individual wavelength components, with each individual wavelength leaving the surface of the grating 26 as a collimated beam 28, but at a slightly different angle in the horizontal plane. All of the light of a particular wavelength will defract at the same angle. The collimated beam 28 of various wavelengths, or spectra, then strike the scanning mirror 38. The scanning mirror 38 is a flat reflective surface mechanically connected, through the vertical axis, to a galvanometer which is conventional and can be purchased off the shelf. Scanning mirror 38 is the primary wavelength selection element of the device 10. Scanning mirror 38 directs the collimated beam 30 of various spectra onto the camera mirror 32. Camera mirror 32 is a second off-axis parabolic (OAP) segment. Camera 32 then focuses the collimated beam 34 onto the exit aperture 36. The exit aperture 36 is a vertical slit shaped aperture having a precisely controlled variable wavelength. By changing the angle of the scanning mirror 38, the wavelength of the light that passes through the exit aperture is changed. The galvanometer allows the angle of the scanning mirror 38 to be changed extremely quickly, and still maintain a high level of angular precision.

The preferred embodiment 10, similar to embodiment 300 of FIG. 7, has several advantages over prior art techniques. They are best understood by describing prior art techniques as set forth in FIGS. 2–4, and then further describing the differences between the present invention 10 and 300, so that its uniqueness is clearer.

Figure 2:
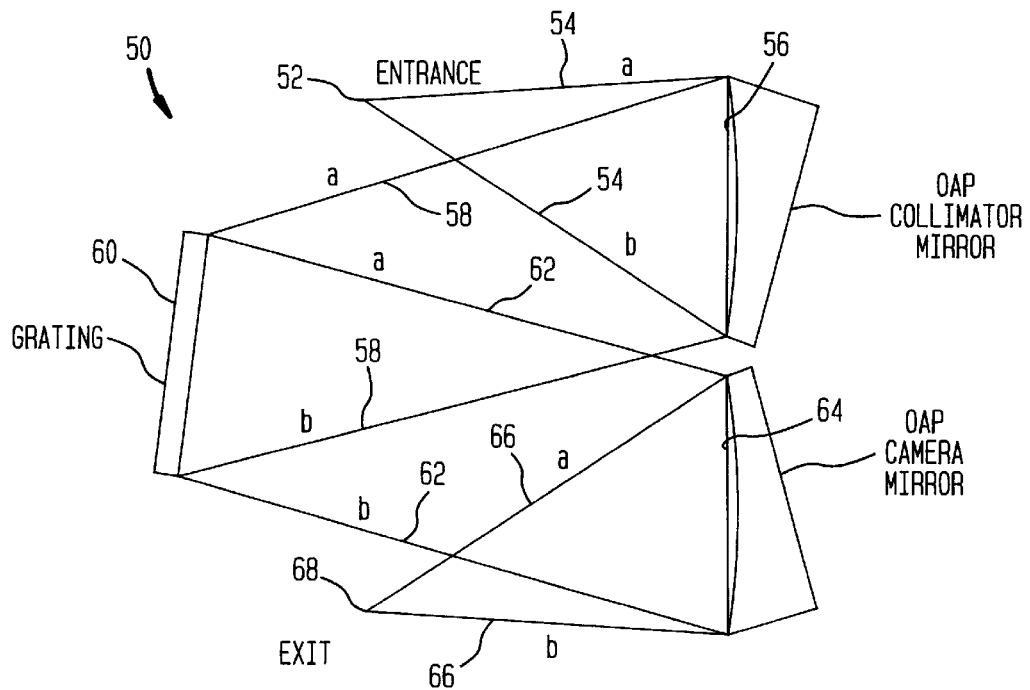
FIG. 2 illustrates a typical Czerny-Turner prior art off-axis parabolic monochromator.
Figure 3:
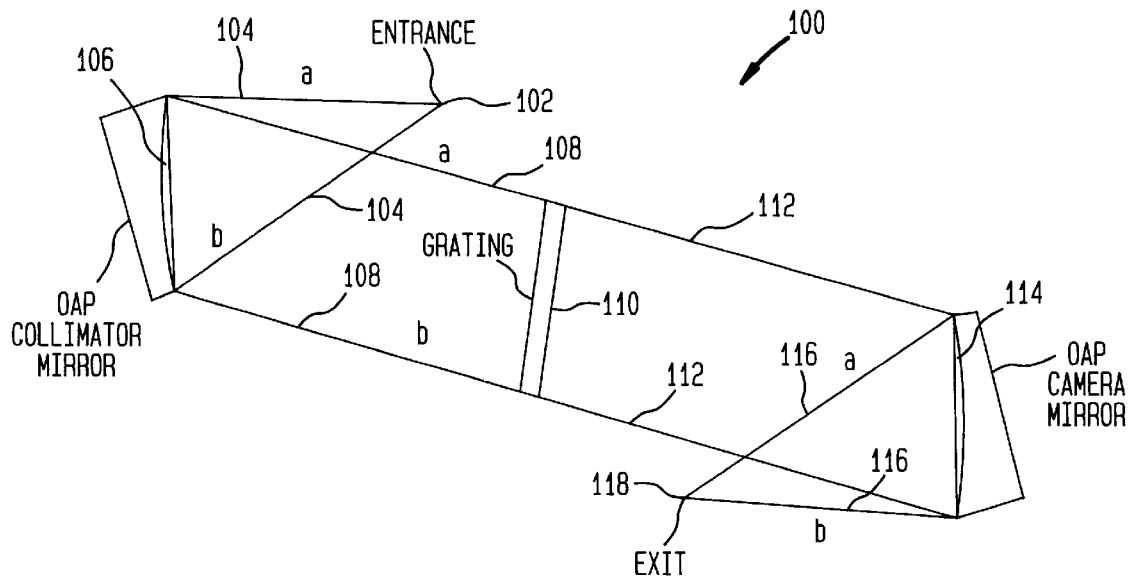
FIG. 3 illustrates the Czerny-Turner prior art monochromator of FIG. 1 unfolded to demonstrate the relative position of the two off-axis parabolic mirrors used therein.
Figure 4:
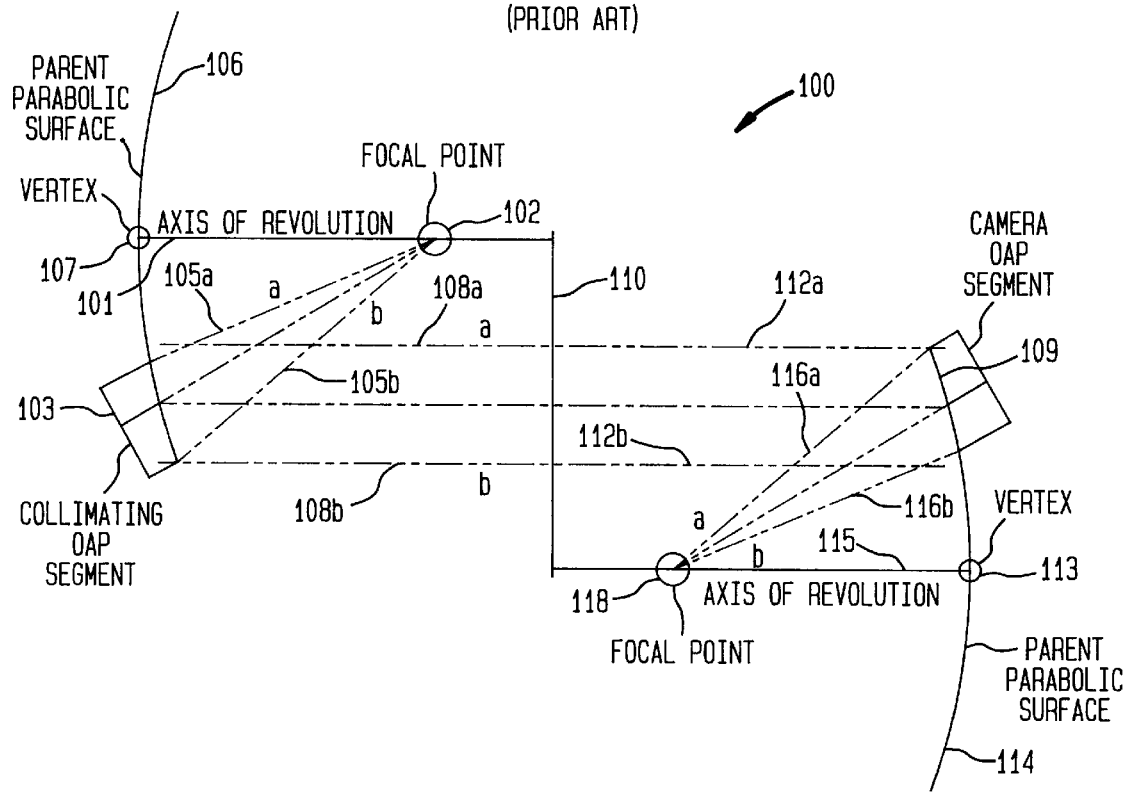
FIG. 4 illustrates the relative position of the parent parabolic surfaces of the prior art, unfolded Czerny-Turner Monochromator illustrated in FIGS. 2 and 3.

FIGS. 2–4 describes a typical Czerny-Turner monochromator which employs off-axis parabolic reflectors.

FIG. 2 illustrates a conventional prior art Czerny-Turner monochromator employing a pair of spherical mirrors 56 and 64 for collimating the incoming broad band (white light) from entrance point 52, as well as for focusing the desired emitted wavelength band onto the exit slit 68. The whit light beam 54 from entrance 52 strikes spherical collimating mirror 56 and is reflected, in a collimated fashion, as beam 58 onto grating 60. The light is then refracted back as beam 62 to the second mirror 64 where it is, in turn, focused as a beam 66 on exit slit 68. Spherical mirrors 56 and 64 introduce significant aberrations into the optical system, which results in reduced resolution.

Even when Czerny-Turner monochromators use off-axis parabolic (OAP) mirrors, there will still be substantial distortion due to spherical aberrations. This is due to the fact that each OAP mirror introduce a spherical aberration, and the mirrors are "opposing" each other. The spherical aberrations of each of the mirrors, therefore, are added together. FIG. 3 illustrates a Czerny-Turner monochromator 100, similar in function and structure to Czerny-Turner monochromator 50 of FIG. 2, but unfolded to demonstrate the relative position of two OAP mirrors. A broad band source of white light enters from entrance slit 102, as beam 104, and impinges upon OAP collimator mirror 106 which, in turn, reflects the beam, as a column 108 onto grating 110. Beam 108 is refracted by grating 110 and reflected as beam 112 onto the second OAP camera mirror 114 which, in turn, focuses it as a beam 116 onto exit slit 118. It can be seen in FIG. 3 that the focal points 102 and 118 of the two OAP mirrors 106 and 114, respectively, are on opposite sides of the collimating beam 108, 112, that is to say, they are opposing each other.

FIG. 4 illustrates the relative positions of the parent parabolic surfaces for this arrangement as prior art embodiment 100. According to prior art Czerny-Turner embodiment 100, light beams bounded by rays 105a and 105b emerge from focal point 102 and impinge upon the collimating OAP segment 103 of parent parabolic surface 106. Parent parabolic surface 106 has a vertex 107 and an axis of revolution 101. Light beam rays 108a, 108b are reflected from collimating OAP segment 103 onto grating 110 and defracted as beams 112a and 112b onto the camera OAP segment 109 of the second parent parabolic surface 114. Camera OAP segment 109, in turn, focuses the beams as rays 116a, 116b onto focal point 118. Parent parabolic surface 114 has a vertex 113 and an axis of revolution 115 on which the exit focal point 118 is located. As previously described, with reference to prior art embodiment 50 of FIG. 3, the spherical aberrations of the two parabolic reflectors 106 and 114 are additive, that is to say they combine, in configurations 10, 50 and 100. Spherical aberrations are introduced because the OAP mirrors 106 and 114 are actually segments from a parabolic spheroid. A parabolic spheroid is a surface, in this case of a mirror, that is only parabolic in one axis, but is spherical in the other.

Figure 5:
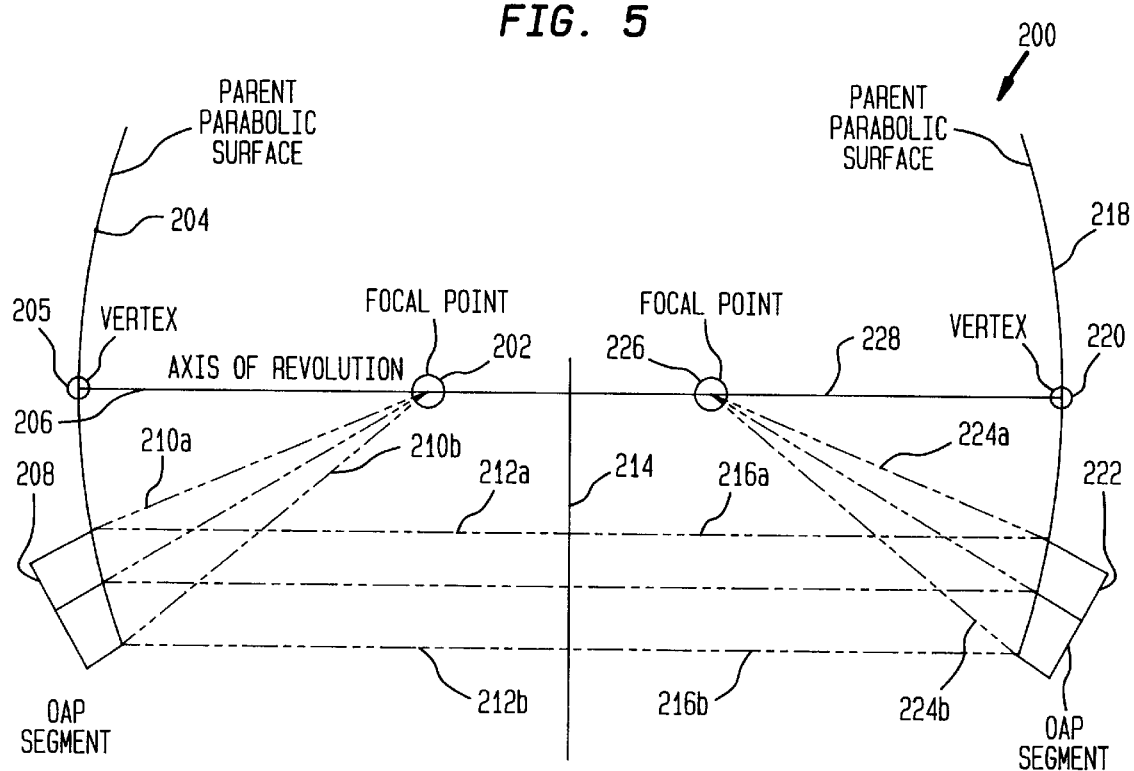
FIG. 5 illustrates an arrangement in which a pair of parabolic surfaces share both the same axis and revolution and the same collimated beam axis.

In order to overcome these disadvantages, it has been learned that the aberrations can be further minimized if the parabolic mirrors share both the same axis of revolution and the collimated beam axis. In this fashion they would not be opposing each other. The preferred embodiment of this arrangement is illustrated in FIG. 5. According to the embodiment 200 of FIG. 5, light from focal point 202, is emitted as ray segments 210a and 210b which impinge upon OAP segment 208 of a first parent parabolic surface 204 which has a vertex 205 and an axis of revolution 206 which passes through the focal point 202. Collimated light rays 212a and 212b in turn reflect upon grating 214 and are refracted as rays 216a and 216b onto the second OAP segment 222. OAP segment 222 is part of a second parent parabolic surface 218 having a vertex 220 and an axis of revolution 228. The light 216a, 216b that impinges upon OAP segment 222 is focused as rays 224a, 224b onto focal point 226 which lies on the axis of revolution 228 of the second parabolic surface 218. With this arrangement, the spherical aberrations of the first OAP mirror 204 are canceled by the second OAP mirror 218.

Figure 6:
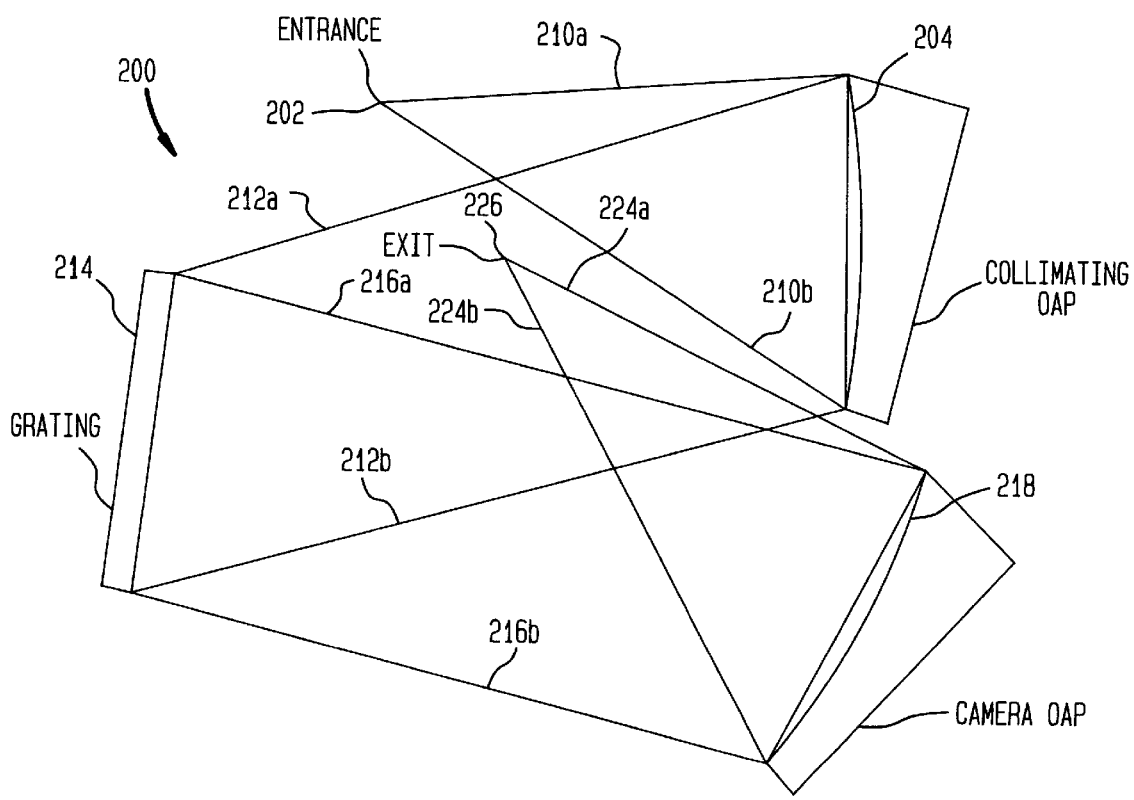
FIG. 6 illustrates the coaxial, off-axis parabolic reflector of FIG. 5 in which the light path is folded once.

Unfortunately, when the arrangement 200 as illustrated in FIG. 5 is folded, the design becomes impractical. FIG. 6 illustrates the embodiment 200 with a single fold of the mirrors 204 and 218. This regrettably places the exit slit 226 in the middle of the collimating beams 212a and 212b. It would not be convenient or practical, therefore, to fold the apparatus 200 once because the beams and related mechanical portions of the invention 200 would interfere with each other.

It has been found, however, that this dilemma can be solved by introducing a second folding mirror in the collimated beam path between the grating and the camera mirror. The preferred embodiment 300 of the invention with two folds is illustrated in FIG. 7. Light from an entrance slit 302 emerges as a light beam bounded by rays 304a, 304b which impinges upon a first collimating OAP mirror 306. Collimated light beams bounded by rays 308a, 308b are reflected onto grating 310 and are refracted back to a scanning mirror 314 as a beam bounded by rays 312a, 312b. Scanning mirror 314, in turn, reflects the refracted light beam 316a, 316b onto the second camera OAP mirror 318. The second camera OAP mirror 318, in turn, focuses the light as a beam bounded by rays 320a, 320b onto exit slit 322. When the scanning mirror 314 is used to select wavelength, the beam of light emitted from the monochromator 300 changes angle as it changes wavelength. To reduce this effect, the scanning mirror 314 is moved away from the exit slit 322. In fact, it is preferably moved into the collimated beam path 312a, 312b and 316a, 316b between grating 310 and the second OAP camera mirror 318. In this position, the necessary conditions exist to take advantage of the coaxial and non-opposing OAP mirrors 306 and 318. This ultimate result would not be possible without the use of the second folding mirror 314 in the collimated beam path.

The ultimate invention 300, according to the preferred embodiment, has the following unique and advantageous characteristics. It is capable of accepting a broad wavelength beam of light, i.e., white light, and dividing the broad band beam of light into discrete wavelength bands of less than 1 nm optical wavelength, and emit only the desired wavelength band. The device 300 is capable of transmitting ultraviolet, visible and near infrared optical wavelengths in the range of the full optical spectrum, depending on the grating used. The device is also capable of changing wavelength bands in less than 2 milliseconds. In addition, the device 300 is capable of changing the emitted wavelength bands in four different modes. In the first, or alternating mode, the device 300 oscillates back and forth between a discrete band of, for example, 340 nm optical wavelength and 380 nm optical wavelength. The transition time between each wavelength is in the order of less than 2 milliseconds. In the second, or scanning mode, the device moves from a discrete band of, for example, 340 nm optical wavelength to a discrete band of 450 nm optical wavelength in sequential segments of 5 nm. Each 5 nm step is accomplished in less than 2 milliseconds. In the third, or random mode, the device moves through a non-sequential series of discrete band of, for example, 340 nm, 450 nm, 310 nm, 633 nm, etc. The transition time between each wavelength band is less than 2 milliseconds. The fourth, and final, mode is the slewing mode in which the device 300 oscillates back and forth between a discrete band of, for example, 300 nm optical wavelength and 600 nm optical wavelength. The transition time between each wavelength band of 300 and 600 nm is preferably less than 2 milliseconds. The transition time must be consistent enough that during a slewing cycle, a given emitted wavelength band can be calibrated to a particular time interval, or phase cycle, within an acceptable margin of error.

In summary, the invention 300 also differs from typical prior art devices in the following novel and non-obvious ways to accomplish improved results. First, the scanning mirror 314 is not at the exit slit but is much deeper in the optical path. This minimizes the distance between the exit slit and the mirror, which reduces the amount of change in beam angle with wavelength change. It also extends the usable range of wavelength selection to a practical range, eliminating the need for second drive mechanism. Second, the galvanometer scanner, which drives mirror 314, provides the necessary precision, and flexibility of position, to cover a brad wavelength range with a single motor. This motor, in combination with a unique and advanced optical layout, such as described in FIG. 7, allows for all four of the required modes of wavelength change, namely alternating, scanning, random, and slewing as previously described in a single device 300. Third, as a result of the unique optical layout 300, as illustrated in FIG. 7, the scanning mirror 314, and not the grating 310, is the component which selects, or changes, the emitted wavelength. Because of its lower mass, the mirror is able to perform the wavelength changes in less than 2 milliseconds, regardless of wavelength separation or direction. Fourth, and finally, the optical layout of the preferred embodiment 300 is directly responsible for superior optical performance, in terms of resolution, in spite of its reduced size because the spherical aberrations of the mirrors substantially cancel each other. This a direct result of the synergistic use of the scanner mirror as a key optical component in a radically new monochromator optical layout.

While the invention has been described with reference to the preferred embodiment, it will be appreciated by those of ordinary skill in the art that modifications can be made to the structure and function of the invention without departing from the spirit and scope thereof.

We claim:

1. A random access monochromatic illuminator apparatus comprising:

a first entrance slit for admitting a light beam from a source;

a first optical means for collimating said beam of light, said first optical means comprising a first parabolic reflector means;

a grating for defracting said beam of light;

a second optical means for focusing the defracted beam of light to an exit, said second optical means comprising a second parabolic reflector means; and a scanning means for scanning said defracted beam of light from said grating, said scanning means comprising a rotatable mirror located between said grating and said first or second parabolic reflector means, wherein the path of said beam of light is folded, and is coaxial and off-axis with respect to said first and second parabolic reflector means, such that the optical aberrations of said first parabolic reflector means are substantially canceled by said second parabolic reflector means.

2. The apparatus of claim 1 wherein said parabolic reflector means comprise mirrors that have a parabolic cross-section in a first axis and a spherical cross-section in second axis perpendicular to said first axis.

* * * * *